(12) United States Patent
Sand et al.

(10) Patent No.: US 12,537,018 B2
(45) Date of Patent: Jan. 27, 2026

(54) METHOD AND SYSTEM FOR PREDICTING A MENTAL CONDITION OF A SPEAKER

(71) Applicant: ELEOS MENTAL SYSTEMS LTD., Tel Aviv-Jaffa (IL)

(72) Inventors: Daniel Sand, Tel Aviv-Jaffa (IL); Samuel Jefroykin, Tel Aviv-Jaffa (IL); Ilan Kahan, Tel Aviv-Jaffa (IL); Tal Simon, Tel Aviv-Jaffa (IL); Alon Rabinovich, Tel Aviv-Jaffa (IL); Shiri Sadeh-Sharvit, Tel Aviv-Jaffa (IL)

(73) Assignee: ELEOS MENTAL SYSTEMS LTD., Tel Aviv-Jaffa (IL)

( * ) Notice: Subject to any disclaimer, the term of this patent is extended or adjusted under 35 U.S.C. 154(b) by 255 days.

(21) Appl. No.: 18/217,880

(22) Filed: Jul. 3, 2023

(65) Prior Publication Data
US 2024/0071412 A1    Feb. 29, 2024

Related U.S. Application Data

(60) Provisional application No. 63/402,540, filed on Aug. 31, 2022.

(51) Int. Cl.
*G10L 25/63* (2013.01)
*G10L 25/30* (2013.01)

(52) U.S. Cl.
CPC .............. *G10L 25/63* (2013.01); *G10L 25/30* (2013.01)

(58) Field of Classification Search
CPC ......... G10L 25/63; G10L 25/30; G10L 25/18; G10L 25/66; G06F 40/284; G06F 40/30; A61B 5/165; A61B 5/4803
See application file for complete search history.

(56) References Cited

U.S. PATENT DOCUMENTS 10,580,435 B2 * 3/2020 Ashoori .................. G10L 15/26
11,887,622 B2 * 1/2024 Hu .......................... G10L 25/66
(Continued)

FOREIGN PATENT DOCUMENTS

JP    2009003162 A  *  1/2009

OTHER PUBLICATIONS

Patient Health Questionnaire-9 (PHQ-9)—Mental health screening—National HIV curriculum. (2024). Available online: [https://www.hiv.uw.edu/page/mental-health-screening/phq-9].
(Continued)

*Primary Examiner* — Pierre Louis Desir
*Assistant Examiner* — Cody Douglas Hutcheson
(74) *Attorney, Agent, or Firm* — The Roy Gross Law Firm, LLC; Roy D. Gross

(57) ABSTRACT

Systems and methods of the present invention may relate to prediction of a mental health score, representing a mental condition of a speaker. Embodiments of the invention may analyze speech by receiving an audio data element representing a discussion; extracting a first set of audio segments pertaining to speech of a first speaker in the discussion; analyzing the first set of audio segments to produce a set of audio features; and applying a machine-learning (ML) model on the set of audio features, to predict a mental health score, representing a mental condition of the first speaker. Embodiments of the invention may provide technical means for supporting psychiatric assessment of mental disorders such as depression and anxiety in an automatic, nondisruptive manner, e.g., without direct patient's collaboration, thereby increasing validity of the assessment.

16 Claims, 7 Drawing Sheets

(56) References Cited

U.S. PATENT DOCUMENTS

| | | | |
|---|---|---|---|
| 11,922,968 B2* | 3/2024 | Stojancic | G10L 25/18 |
| 2017/0206915 A1* | 7/2017 | Prasad | G10L 25/63 |
| 2019/0385711 A1* | 12/2019 | Shriberg | G16H 15/00 |
| 2023/0352194 A1* | 11/2023 | Kim | G16H 50/50 |
| 2024/0374187 A1* | 11/2024 | Liyanage | A61B 5/165 |

OTHER PUBLICATIONS

Generalized Anxiety Disorder 7-Item (GAD-7)—Mental health screening—National HIV curriculum. (2024). Available online: [https://www.hiv.uw.edu/page/mental-health-screening/gad-7].

* cited by examiner

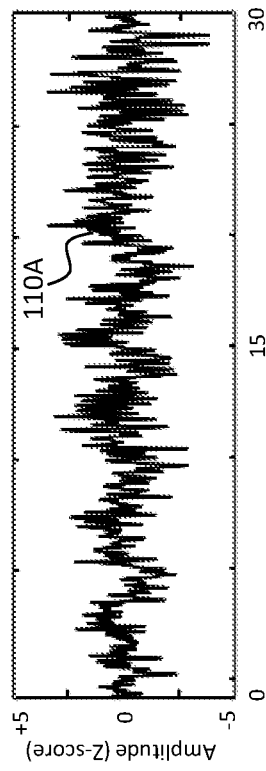
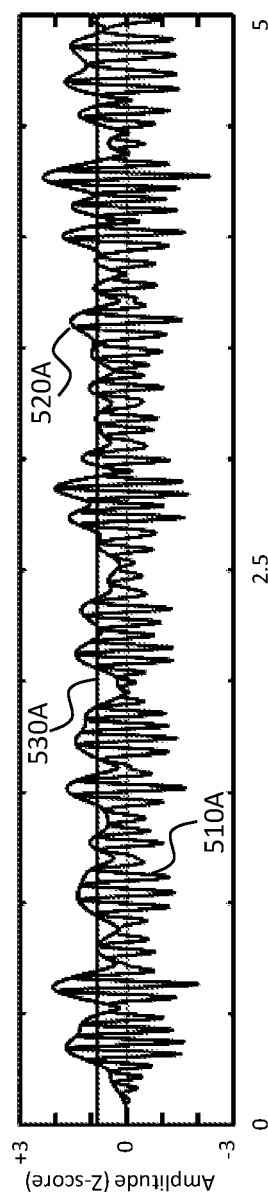
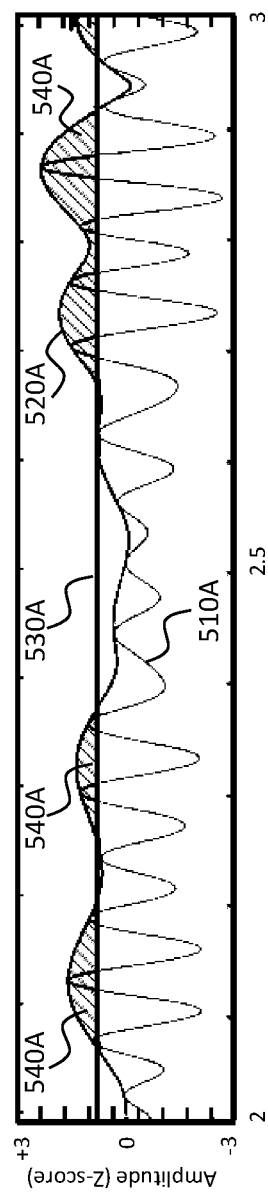
FIG. 3A
FIG. 3B
FIG. 3C

METHOD AND SYSTEM FOR PREDICTING A MENTAL CONDITION OF A SPEAKER

CROSS REFERENCE TO RELATED APPLICATIONS

This application claims the benefit of priority of U.S. Provisional Patent Application No. 63/402,540, filed Aug. 31, 2022, entitled "METHOD AND SYSTEM FOR PREDICTING A MENTAL CONDITION OF A SPEAKER", which is incorporated herein by reference as if fully set forth herein in its entirety.

FIELD OF THE INVENTION

The present invention relates generally to systems and methods of speech analysis. More specifically, the present invention relates to predicting a mental health score, representing a mental condition of a speaker.

BACKGROUND OF THE INVENTION

As it is known, upon the development of technology, methodology employed in healthcare, more particularly—in diagnosis field, constantly evolves from approaches relying on guesswork to measurement-based approaches relying on data.

Historically there are healthcare branches, such as pathology or radiology, which have the minimal communication between therapists and patients, and there are branches, such as psychiatry and family medicine, which emphasize the therapist—patient relationship and, consequently, rely on guesswork more than others. Psychiatry and, more particularly, psychiatric diagnosis involve a wide variety of diagnostic procedures from general observation of patient's behavior and formalized psychological tests to brain scans and analysis of genetic factors. However, on the whole, the involvement of measurement-based approaches in the psychiatric assessment remains research topics.

In particular, the assessment of depression and anxiety disorders commonly includes routine use of screening questionnaires, upon completing of which a valid evaluation of patient's mental state is provided in the form of mental health score. The employment of this methodic, even though it is considered as a measurement-based one, has specific validity issues in practice. Namely, patients often fail to complete questionnaires routinely, thereby limiting the therapist's decision-making capacity. Obviously, patients may find it difficult to engage in completing self-report assessments in view of their mental condition. Often even deception may occur while completing questionnaires. Consequently, a patient's collaboration may fluctuate and, what is even worse, becomes weaker upon worsening of the mental condition.

SUMMARY OF THE INVENTION

Accordingly, there is a need for a technical means for supporting psychiatric assessment of mental disorders such as depression and anxiety in an automatic nondisruptive manner, e.g., without direct patient's collaboration, and thereby increasing validity of the assessment.

To overcome the abovementioned shortcomings of the prior art, the following invention is provided.

In the first aspect, the invention may be directed to a method of analyzing speech by at least one processor, in some embodiments, the method may include receiving an audio data element representing a discussion; extracting a first set of audio segments pertaining to speech of a first speaker in the discussion; analyzing the first set of audio segments to produce a set of audio features; and applying a machine-learning (ML) model on the set of audio features, to predict a mental health score, representing a mental condition of the first speaker.

In the second aspect, the invention may be directed to a system for analyzing speech, the system including: a non-transitory memory device, wherein modules of instruction code are stored, and at least one processor associated with the memory device, and configured to execute the modules of instruction code, whereupon execution of said modules of instruction code, the at least one processor is configured to: receive an audio data element representing a discussion; extract a first set of audio segments pertaining to speech of a first speaker in the discussion; analyze the first set of audio segments to produce a set of audio features; and apply a ML model on the set of audio features, to predict a mental health score, representing a mental condition of the first speaker.

In some embodiments, mental health score represents an expected response of the first speaker in a mental health questionnaire.

In some embodiments, the specified method may additionally include analyzing the first set of audio segments to produce one or more textual n-grams; analyzing the one or more textual n-grams to produce at least one textual feature, representing a mental condition of the first speaker; and further applying the ML model on the at least one textual feature, to predict the mental health score.

In some embodiments, producing a set of audio features may include analyzing the first set of audio segments to produce at least one audio burst; and analyzing the at least one audio burst, to calculate one or more audio features selected from a list consisting of: audio burst amplitudes, audio burst duration, audio burst coefficient of variation (CV), and audio burst Area Under Curve (AUC).

In addition, in some embodiments, producing at least one audio burst may include applying a band-pass filter on an audio segment of the first set of audio segments, to obtain a filtered version of the audio segment; applying a Hilbert transform on the filtered version of the audio segment, to obtain a Hilbert envelope; determining a burst threshold value; and defining the at least one audio burst based on the Hilbert envelope and the burst threshold value.

In addition, in some embodiments, the specified method may further include calculating the audio burst AUC as an integral between a positive edge of the Hilbert envelope and the burst threshold value.

In some embodiments, the specified method may further include monitoring the predicted mental health score over time; and identifying one or more timestamps corresponding to points in the discussion, where the first speaker is suspected to have been in a predefined mental condition, based on said monitoring.

In addition, in some embodiments, the specified method may further include producing a reference data element, including a plurality of identified timestamps, corresponding to one or more discussions, and respective predictions of mental health score; and providing a notification of previous at least one case in which the first speaker is suspected to have been in the predefined mental condition, based on the reference data element.

In addition, in some embodiments, the specified method may further include analyzing the reference data element, in relation to a plurality of identified timestamps; and producing a recommendation data element, representing a recommendation of treatment, based on said analysis.

In addition, in some embodiments, the specified method may further include extracting a second set of audio segments pertaining to speech of a second speaker in the discussion; analyzing the second set of audio segments to produce one or more second textual n-grams; and associating the one or more second textual n-grams to at least one identified timestamp in the reference data element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A-3C are diagrams, depicting an example of audio data element processing by the feature extraction module, presented in various scale;

Figure 1:
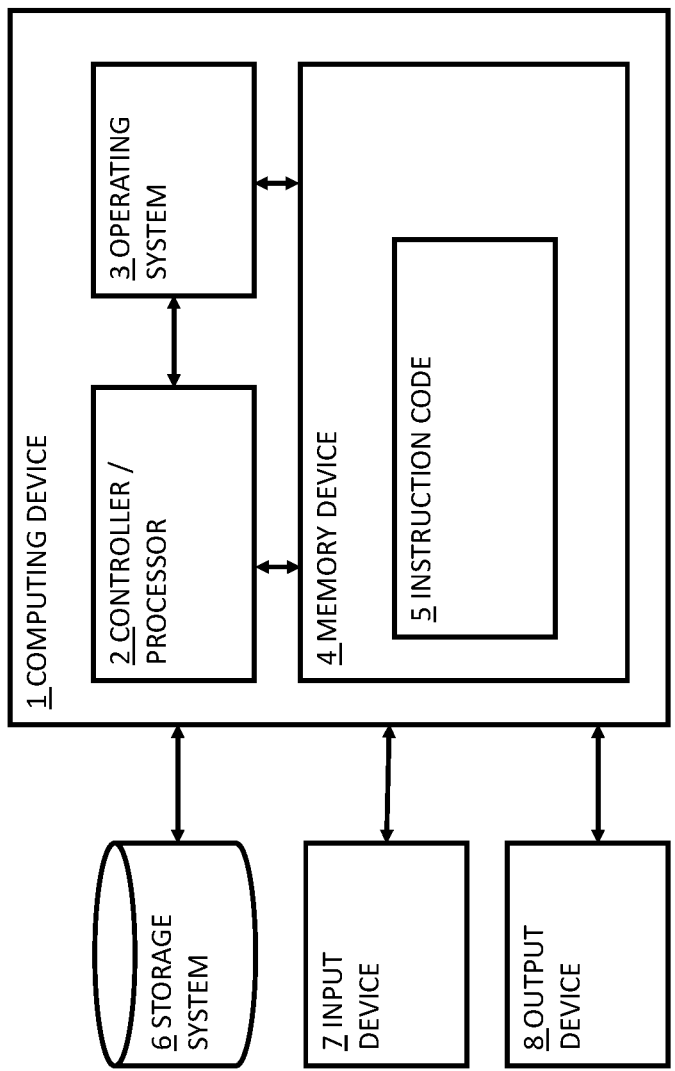
FIG. 1 is a block diagram, depicting a computing device which may be included in a system for analyzing speech according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

In some embodiments of the present invention, ML model may be an artificial neural network (ANN).

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

It should be understood, that for purposes of the claimed invention, every ML model used herein in order to do the specified tasks has to be sufficiently trained based on an appropriate set of examples. It should be obvious for the one ordinarily skilled in the art that various ML models can be implemented without departing from the essence of the present invention. It should also be understood, that in some embodiments ML model may be a single ML model or a set (ensemble) of ML models realizing as a whole the same function as a single one. Hence, in view of the scope of the present invention, the abovementioned variants should be considered equivalent.

As known in the art, psychiatric assessment commonly includes analysis of a patient's current mental condition under the domains of appearance, attitude, behavior, speech, mood etc. Speech assessment therein generally incorporates observing the patient's spontaneous speech and preferably relies on analysis of production of speech rather than analysis of its content.

For instance, depressed people tend to speak lower, slower, quitter, flatter, and softer. The range of pitch and volume of their voices drop, speech sounds labored, since it is produced in a hesitant manner. Furthermore, their speech has prolonged latency with a lot of starts and stops, pauses, and stutters.

It is also known that depression may cause immoderate body relaxation. Such relaxation with respect to the vocal cords may cause speech to sound breathless, which may be used as an additional indicator of depression. It is also possible that depressed patients' tongues and breaths become uncoordinated, resulting in slight slurring of their speech.

On the other hand, patients who suffer from anxiety experience quite the opposite. They have more tension in their bodies, which naturally affects their voices. There is a faster pace to their speech, it is louder and produced in a pressured manner, consequently, such patients usually have a harder time breathing.

Hence, as it is suggested in the claimed invention, predicting a mental health score that represents a mental condition of a patient by analyzing his speech will provide a reliable support to the psychiatric assessment of mental conditions such as depression and anxiety disorders in an automatic, nondisruptive manner.

Reference is now made to FIG. 1, which is a block diagram, depicting a computing device which may be included in a system for analyzing speech according to some embodiments.

Computing device 1 may include a processor or controller 2 that may be, for example, a central processing unit (CPU) processor, a chip or any suitable computing or computational device, an operating system 3, a memory device 4, instruction code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be an application that may predict a mental health score, representing a mental condition of a speaker, as further described herein. Although, for the sake of clarity, a single item of instruction code 5 is shown in FIG. 1, a system according to some embodiments of the invention may include a plurality of modules of instruction code similar to instruction code 5 that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to recorded speech (e.g., audio data element representing a discussion) may be stored in storage system 6 and may be loaded from storage system 6 into memory device 4 where it may be processed by processor or controller 2.

In some embodiments, some of the components shown in FIG. 1 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse, a microphone and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

It should be apparent that storage system 6, input device 7 and output device 8 may have both built-in and external implementation with respect to the computing device 1.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2A:
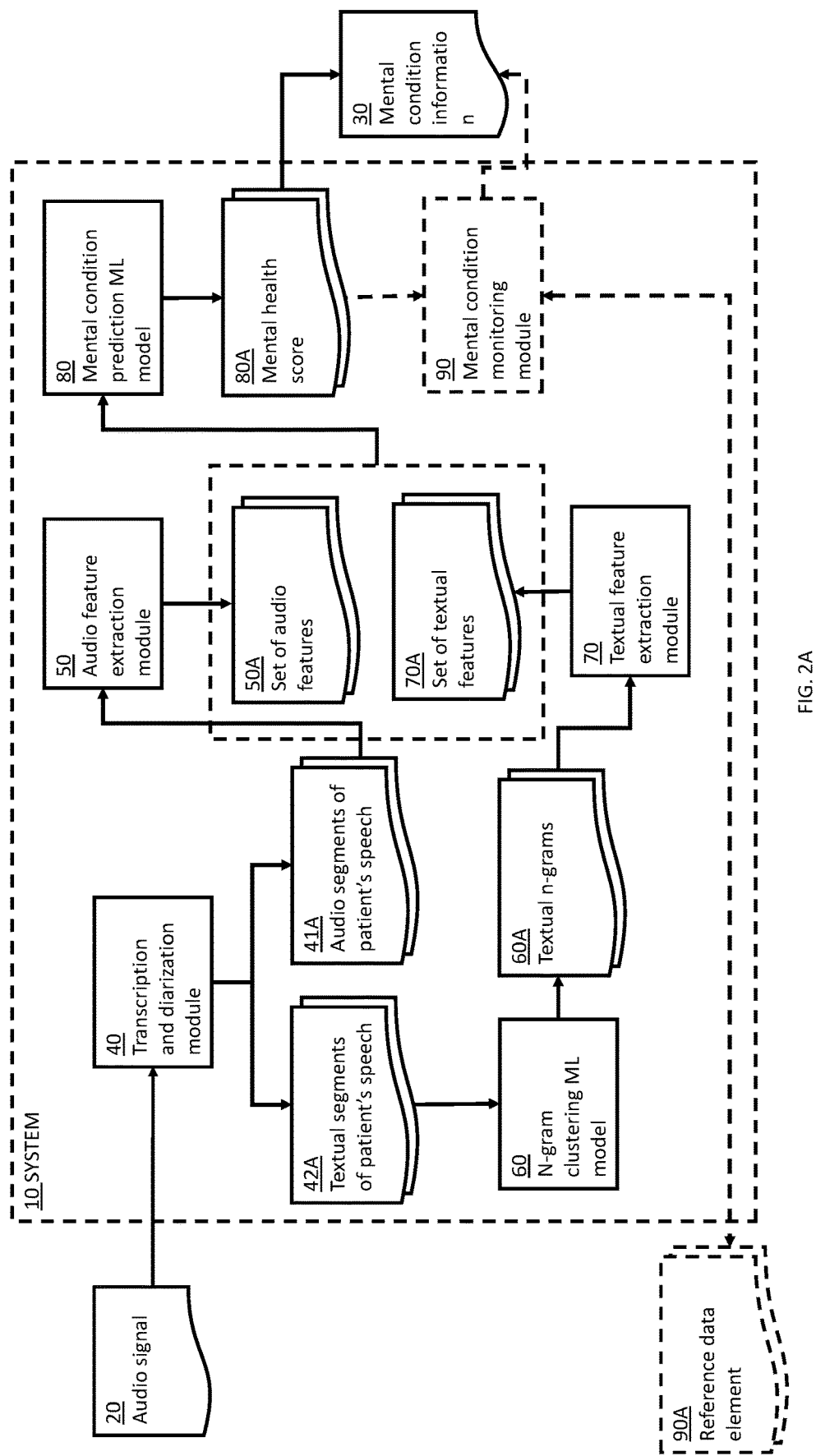
FIG. 2A is a block diagram, depicting a system for analyzing speech, according to some embodiments.
Figure 2B:
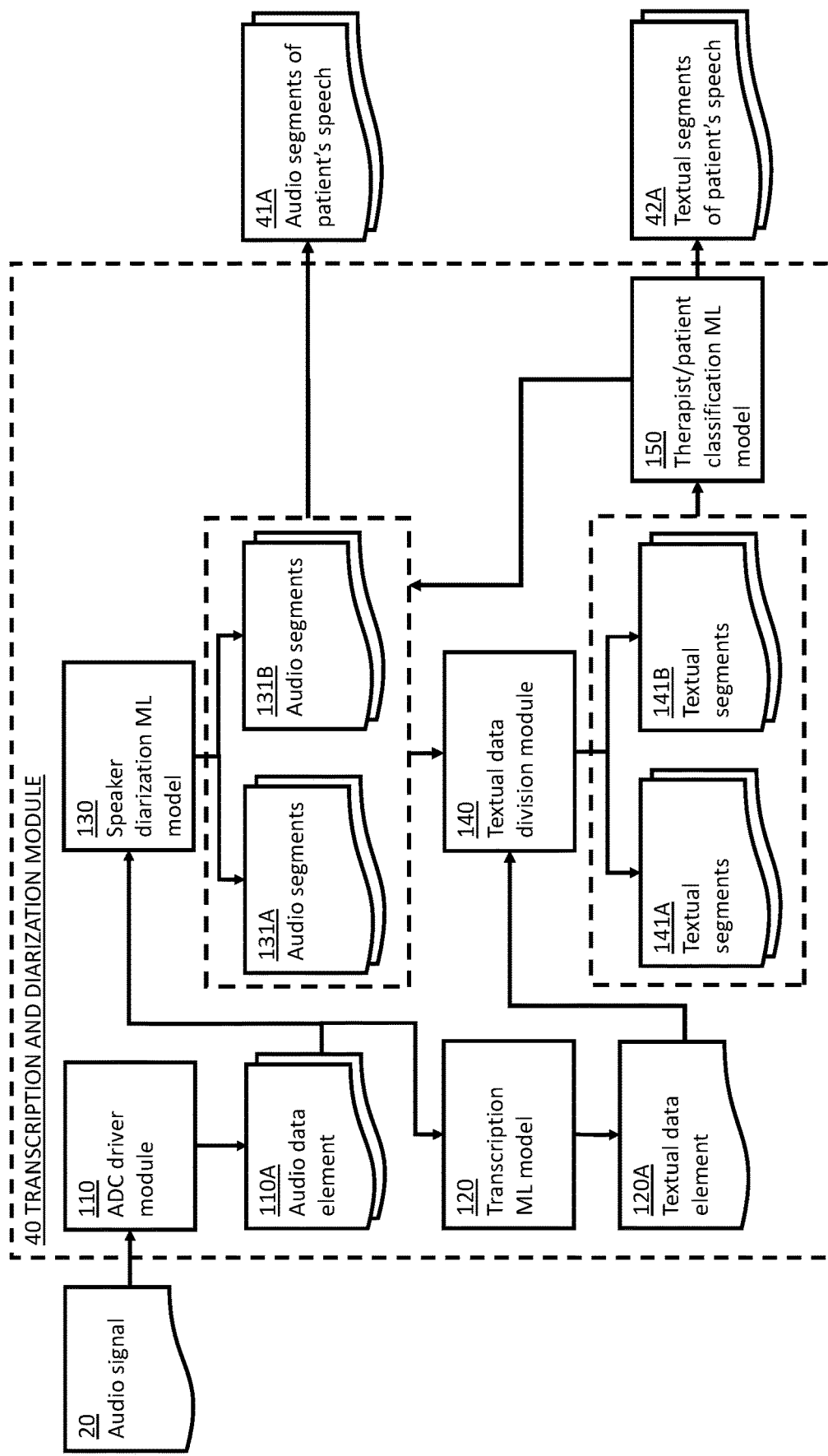
FIG. 2B is a block diagram, depicting a transcription and diarization module of the system for analyzing speech, according to some embodiments.
Figure 2C:
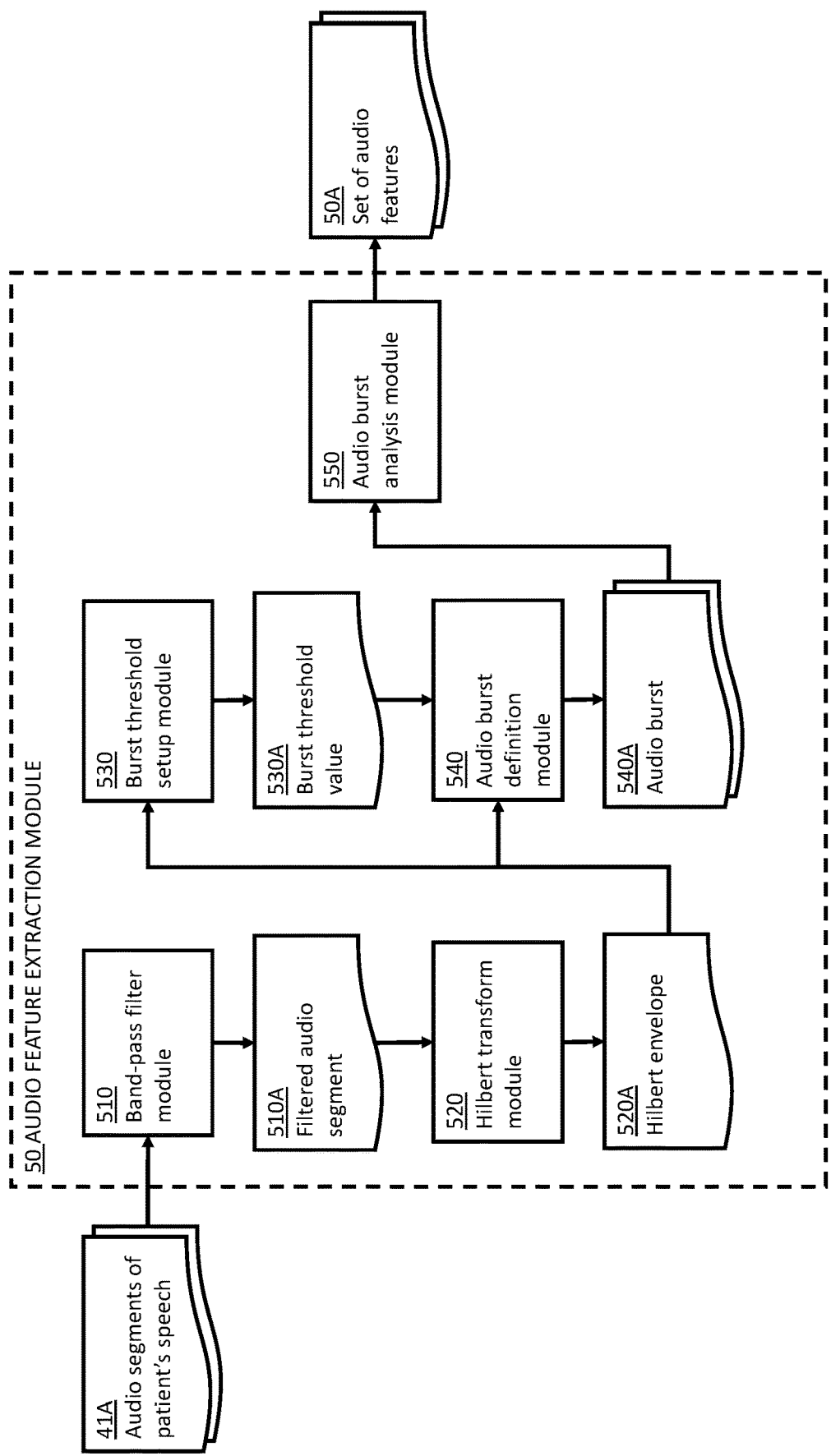
FIG. 2C is a block diagram, depicting an audio feature extraction module of the system for analyzing speech, according to some embodiments.

Reference is now made to FIG. 2A-2C, which represent block diagrams, depicting a system 10 for analyzing speech and its components in detailed view, according to some embodiments.

According to some embodiments of the invention, system 10 may be implemented as a software module, a hardware module, or any combination thereof. For example, system 10 may be or may include a computing device such as element 1 of FIG. 1 and an input device 7 (e.g., a microphone) configured to receive an audio signal 20. Furthermore, system 10 may be adapted to execute one or more modules of instruction code 5 to predict a mental health score 80A, representing a mental condition of a speaker, as further described herein.

Arrows may represent flow of one or more data elements to and from system 10 and/or among modules or elements of system 10. Some arrows may be omitted for the purpose of clarity.

In some embodiments, system 10 may further include a transcription and diarization module 40 of instruction code 5. Transcription and diarization module 40 may be configured to receive audio signal 20 representing a discussion (e.g., discussion between patient and therapist) and extract a set of audio segments pertaining to speech of a one of the speakers in the discussion (audio segments 41A of patient's speech). Transcription and diarization module 40 is further described in detail with reference to FIG. 2B.

Reference is now made to FIG. 2B depicting a block diagram of transcription and diarization module 40 of system 10 for analyzing speech, according to some embodiments.

In some embodiments, transcription and diarization module 40 may further include analog-to-digital conversion (ADC) driver module 110 of instruction code 5, whereupon execution of said module of instruction code 5, processor 1 may be configured to employ ADC to convert analog audio signal 20 into a digital signal (audio data element 110A) and save audio data element 110A on memory device 4 in the form of audio file of any common standard (WAV, MP3, etc.).

It should be understood, that in order to analyze the speech of one of the speakers (e.g., patient) in the discussion, audio segments pertaining to his speech has to be separated from audio segments pertaining to the speech of other speaker(s) (e.g., therapist) first. Hence, according to some embodiments, system 10 may include transcription ML model 120, speaker diarization ML model 130, textual data division module 140 and therapist/patient classification ML model 150.

In some embodiments, transcription ML model 120 may be configured to receive audio data element 110A representing a discussion and to produce textual data element 120A representing a transcription of the discussion. In some embodiments, transcription ML model 120 may be trained by supervised learning algorithms using a labeled set of training examples, which, in turn, may include pairs of audio data elements representing a speech and textual data elements representing a transcription of the speech. It should be apparent to the one skilled in the art that any ML model conventionally used for speech recognition tasks could be used as transcription ML model 120 without departing from the essence of the present invention.

In some embodiments, speaker diarization ML model 130 may be configured to receive audio data element 110A and divide it into audio segments pertaining to speech of the first speaker (audio segments 131A) and audio segments pertaining to speech of the second speaker (audio segments 131B). In some embodiments, speaker diarization ML model 130 may employ clustering ML techniques. In some embodiments, speaker diarization ML model 130 may be trained by unsupervised learning algorithms using an unlabeled set of training examples, which, in turn, may include segments of the audio data elements pertaining to different speakers in the discussion.

In some embodiments speaker diarization ML model 130 may be based on Gaussian mixture model and/or a Hidden Markov model. It should be apparent to the one skilled in the art that any ML model conventionally used for speaker recognition tasks could be used as speaker diarization ML model 130 without departing from the essence of the present invention.

In some embodiments, textual data division module 140 may be a module configured to divide textual data element 120A into textual segments 141A pertaining to speech of the first speaker and textual segments 141B pertaining to speech of the second speaker according to classified audio segments 131A, 131B.

In some embodiments, therapist/patient classification ML model 150 may be configured to receive textual segments 141A pertaining to speech of the first speaker and textual segments 141B pertaining to speech of the second speaker, to classify whether the first speaker or the second speaker is a therapist or a patient and produce textual segments 42A of patient's speech. In some embodiments, therapist/patient classification ML model 150 may be trained by supervised learning algorithms using a labeled set of training examples, which, in turn, may include textual segments pertaining to speech of different speakers and corresponding labels identifying which speaker is a therapist or a patient. In some embodiments, therapist/patient classification ML model 150 may be configured using stochastic gradient descent (SGD) optimization upon training.

In some embodiments, therapist/patient classification ML model 150 may be configured to classify whether the first speaker or the second speaker is a therapist, or a patient based on various features, e.g., based on specific term frequencies that characterize speech of one person or role (e.g., a therapist), in relation to specific term frequencies that characterize speech of another person or role (e.g., a patient). In other words, therapist/patient classification ML model 150 may be configured to evaluate how frequently specific terms appear in textual segments 141A and 141B.

For example, in some embodiments of the invention, classification ML model 150 may utilize a TF-IDF (Term Frequency-Inverse Document Frequency) metric for determining a role of a speaker. As known in the art, TF-IDF is a statistical measure that evaluates how relevant a word is to a document in a collection of documents. This may be done by multiplying two metrics: how many times a word appears in a document, and the inverse document frequency of the word across a set of documents.

In an exemplary implementation of system 10, the classification of whether a speaker is a therapist may be based on the appearance of the following terms, that have shown the respective TF-IDF coefficient values: "how"–1.365, "yourself"–1.432, "your"–4.795, "you"–10.5, "so"–4.022, etc. The classification of whether a speaker is a patient, in turn, may be based on the appearance of the following terms with the respective coefficient values: "know"–7.033, "he"–3.373, "she"–3.197, "me"–4.756, "oh"–3.063, "um"–2.944 etc. Such coefficients may be calculated during supervised training of therapist/patient classification model 150 to represent a degree of relevance to a speech of a therapist or patient respectively.

Furthermore, system 10 may be configured to apply therapist/patient classification ML model 150 output (classification on whether the first speaker or the second speaker is a therapist or a patient) to audio segments 131A and 131B to label which audio segments pertain to speech of the therapist/patient and, consequently, extract audio segments 41A of patient's speech.

Reference is now made back to FIG. 2A.

It should be apparent that upon analyzing speech in order to validly predict mental health score 80A, representing a mental condition of a speaker (e.g., patient), various inherent audio features of the speech and combinations thereof can be found useful.

In some embodiments, system 10 may include an audio feature extraction module 50 configured to analyze the first set of audio segments (e.g., the set of audio segments which has already been classified as pertaining to speech of the patient—audio segments 41A of patient's speech). Feature extraction module 50 is further configured to define set 50A of audio features including but not limited to, fundamental voice frequency (also known as F0, which is a frequency the vocal cords vibrate at upon making voice sounds), zero-crossing rate (ZCR), energy, entropy of energy, spectral centroid, mel-frequency cepstral coefficients (MFCCs), speech rate and audio burst features. Audio bursts are further described in detail with reference to FIGS. 2C and 3A-3C.

In the context of present application, the term "audio burst" may be used to refer to a segment of an upper envelope of a time-varying audio signal amplitude function, having amplitude higher than predefined threshold.

As it is described above, depression and anxiety disorders find expression in the way of producing speech and, consequently, in speech pattern. In particular, rapid, loud and pressured speech, which is typical for patients with anxiety disorder, will have speech pattern with the prevalence of frequently appearing audio bursts, which have rather sharp amplitude increase/decrease and short duration. Slow, quiet and hesitant manner of producing speech with prolonged speech latency, which, in turn, is typical for patients with depression disorder, will have speech pattern with prevalence of infrequently appearing audio bursts, which have rather slow amplitude increase/decrease and comparatively long duration. Hence, considering audio features of audio bursts in order to predict mental health score 80A, representing a mental condition of the patient, will, obviously, provide additional technical effect of increasing reliability of the prediction. Considering audio features of audio bursts also turned out to be more useful for mental health score 80A prediction than standard frequency-based features (e.g., of mel-frequency cepstrum (MFC)) commonly used in speech recognition systems.

The advantage of using audio burst-based features over standard frequency-based features was also proved empirically, which is described herein with reference to FIG. 5 further below.

Reference now is made to FIG. 2C depicting a block diagram of audio feature extraction module 50 of system 10 for analyzing speech, according to some embodiments, and to FIGS. 3A-3C depicting an example of audio data element 110A processing by feature extraction module 50, presented in various scale.

For the purpose of the claimed invention, various features of audio bursts and combinations thereof can be useful. Therefore, in some embodiments, audio feature extraction module 50 may be configured to produce set 50A of audio features, in particular, audio feature extraction module 50 may be configured to analyze the first set of audio segments (audio segments 41A of patient's speech) to produce at least one audio burst 540A; and analyze at least one audio burst 540A, to calculate set 50A of audio features.

In some embodiments, system 10 may include the following modules: band-pass filter module 510, Hilbert transform module 520, burst threshold setup module 530, and audio burst definition module 540.

In some embodiments, band-pass filter module 510 may be configured to apply a band-pass filter on an audio segment of the first set of audio segments (audio segments 41A of patient's speech) to obtain a filtered version of the audio segment (filtered audio segment 510A).

In some embodiments, Hilbert transform module 520 may be configured to apply a Hilbert transform on filtered audio segment 510A to obtain Hilbert envelope 520A.

In some embodiments, burst threshold setup module 530 may be configured to determine burst threshold value 530A.

In some embodiments, burst threshold setup module 530 may be configured to: calculate amplitude value distribution of the first set of audio segments (audio segments 41A of patient's speech) and determine burst threshold value 530A as a $65^{th}$ percentile of the amplitude value distribution. Determining burst threshold value 530A in such way experimentally proved to be providing the highest reliability of mental health score prediction. However, in some alternative embodiments, burst threshold setup module 530 may be configured to determine burst threshold value 530A according to signal-to-noise ratios (SNR) of audio segments of patient's speech 41A. Consequently, in most cases of poor SNR, burst threshold setup module 530 may be configured to increase burst threshold value 530A from $65^{th}$ percentile of the amplitude value distribution up to $90^{th}$ percentile.

In some particular embodiments, audio burst definition module 540 may be configured to define at least one audio burst 540A based on Hilbert envelope 520A and burst threshold value 530A. Namely, in some embodiments, audio burst definition module 540 may be configured to: determine points where Hilbert envelope 520A crosses the burst threshold, and define audio burst 540A as a part of the filtered audio segment 510A between two successive points, wherein the first point is where Hilbert envelope 520A crosses the threshold in the direction of amplitude increase and the second point is where Hilbert envelope 520A crosses the threshold in the direction of amplitude decrease.

Furthermore, system 10 may include audio burst analysis module 550 of instruction code 5 configured to analyze at least one audio burst 540A and calculate one or more audio burst features (set 50A of audio features), wherein the features are selected from a list consisting of: audio burst amplitudes, audio burst duration, audio burst frequency (e.g., calculated by the number of audio bursts in an audio segment divided by time), audio burst coefficient of variation (CV), and audio burst Area Under Curve (AUC).

Furthermore, in some embodiments, audio burst analysis module 550 may be configured to calculate the audio burst AUC as an integral between a positive edge of Hilbert envelope 520A and burst threshold value 530A.

In some embodiments, audio burst analysis module 550 may be configured to calculate the audio burst CV as a standard deviation of an inter burst intervals divided by a mean of an inter burst intervals. Audio burst CV helps to assess regularity of burst's start and end time. CV values close to zero represent a completely regular (rhythmic) process of audio bursts appearance, which have been found to indicate depression. CV values close to one, in turn, represent a Poisson process, having irregular appearance of audio bursts, which have been found to indicate anxiety.

Reference is now made back to FIG. 2A.

Furthermore, system 10 may include mental condition prediction ML model 80. In some embodiments, mental condition prediction ML model 80 may be configured to receive set 50A of audio features and predict mental health score 80A. In some embodiments, mental condition prediction ML model 80 may be trained by supervised learning algorithms using a labeled set of training examples, which, in turn, may include pairs of sets of audio features (e.g., including feature presence/absence and its quantitative representation) and corresponding mental health score. In some embodiments, mental condition prediction ML model 80 may employ conventional regression ML techniques.

Notwithstanding that, in established practice, mental health assessment mostly relies on production of speech rather than its content, analyzing speech content additionally to the analysis of production of speech would provide more mental-health-related data to be analyzed by ML models, and may provide additional technical effect of increasing reliability of mental health score prediction.

Hence, according to some embodiments, system 10 may additionally include n-gram clustering ML model 60 and textual feature extraction module 70 of instruction code 5. The term "n-gram" may be used herein to refer to a contiguous sequence of items from a given sample of text, e.g., phonemes, syllables, letters, words or base pairs, sentences etc.

In some embodiments n-gram clustering ML model 60 may be configured to analyze textual segments 42A of patient's speech to produce one or more textual n-grams 60A. In some embodiments, n-gram clustering ML model 60 may employ clustering ML techniques. In some embodiments, n-gram clustering ML model 60 may be trained by unsupervised learning algorithms using an unlabeled set of training examples, which, in turn, may include textual segments of discussions between therapists and patients. In some embodiments, n-gram clustering ML model 60 can be a Hidden Markov model. However, it should be apparent to the one skilled in the art that any ML model conventionally used for clustering tasks could be implemented as n-gram clustering ML model 60 without departing from the essence of the present invention.

In some alternative embodiments (not shown in figures), n-gram clustering ML model 60 may be configured to analyze the first set of audio segments of patient's speech (e.g., audio segments 41A of patient's speech) to produce one or more textual n-grams 60A. In such alternative embodiments, n-gram clustering ML model 60 may be trained by supervised learning algorithms using a labeled set of training examples, which, in turn, may include pairs of audio data elements pertaining to speech and textual n-grams representing fragments of transcription of the speech. It should be apparent to the one skilled in the art that, in such embodiments, any ML model conventionally used for speech recognition tasks could be implemented as n-gram clustering ML model 60 without departing from the essence of the present invention.

In some embodiments, textual feature extraction module 70 may be configured to analyze one or more textual n-grams 60A to produce at least one textual feature (set 70A of textual features), representing a mental condition of the first speaker. In some particular embodiments, textual feature extraction module 70 may be configured to produce set 70A of textual features including but not limited to language richness, vocabulary size, number of negative words, number of positive words etc.

In some embodiments mental condition prediction ML model 80 may be additionally configured to analyze the at least one textual feature (set 70A of textual features) and predict mental health score 80A. In some embodiments, mental condition prediction ML model 80 may be trained by supervised learning algorithms using a labeled set of training examples, which, in turn, may include pairs of sets of audio and textual features (e.g., including feature presence/absence and its quantitative representation) and corresponding mental health scores.

It should be understood to the one skilled in the art that there are various ways of combining mental health score prediction based on textual features with mental health score prediction based on audio features in order to increase reliability of mental health score prediction in general.

In some embodiments, including the one illustrated in figures, a single mental condition prediction ML model 80 could be implemented. Additionally, or alternatively, system 10 may include two or more separate mental condition prediction ML models 80. In such embodiments, a first ML model 80 may be trained using a labeled set of training examples, which may include pairs of sets of audio features and corresponding mental health scores, and a second ML model 80 may be trained using a labeled set of training examples, which may include pairs of sets of textual features and corresponding mental health scores. Hence, in such embodiments (not shown in figures), system 10 may be additionally configured to compute total mental health score representing a mental condition of the speaker (e.g., patient), wherein the total mental health score equals the highest mental health score of mental health score predicted by the first mental condition prediction ML model and mental health score predicted by the second mental condition prediction ML model.

Additionally, or alternatively, system 10 may be configured to compute total mental health score representing a mental condition of the speaker (e.g., patient), wherein the total mental health score equals an averaged mental health score of mental health score predicted by the first mental condition prediction ML model and the mental health score predicted by the second mental condition prediction ML model.

Additionally, or alternatively, system 10 may be configured to apply at least one ensemble algorithm on the mental health score predicted by the first mental condition prediction ML model and on the mental health score predicted by the second mental condition prediction ML model to predict a total mental health score, representing a mental condition of the speaker (e.g., patient).

Additionally, or alternatively, system 10 may be configured to represent mental condition information 30 based on predicted mental health score 80A by at least one output User Interface UI module (e.g., monitor or display, such as device 8 of FIG. 1). In other words, instruction code 5 may be configured to provide a UI, for displaying a visual representation of mental condition information 30 monitor or display, such as device 8 of FIG. 1.

It should be apparent that various embodiments of UI provided by system 10 can be realized depending on different aspects of its practical implementation. In some embodiments, for instance, system 10 may be configured to be implemented during online psychotherapeutic sessions or online psychiatric appointments (e.g., carried out via video/voice calls or meetings). Therefore, in some embodiments, the UI module can be configured to display the visual representation of mental condition information 30 in a separate overlapping window or segment of display.

As it is known, in order to evaluate the effectiveness of psychotherapeutic sessions and/or treatment approaches, it is important to monitor mental condition changing over time. Since, in practice, this aspect is considered essential, in some embodiments, the claimed invention provides appropriate functionality that is described below.

Namely, in some embodiments, system 10 may include mental condition monitoring module 90 of instruction code 5 configured to monitor predicted mental health score 80A over time and identify one or more timestamps corresponding to points in the discussion, where the speaker (e.g., patient) is suspected to have been in a predefined mental condition, based on said monitoring. In some embodiments, mental condition monitoring module 90 may be configured to monitor predicted mental health score 80A automatically, both during the discussion or afterwards. In some embodiments system 10 can be configured to set up the predefined mental condition (e.g., the predefined mental health score) manually, e.g., wherein therapist inputs it via corresponding input device 7 (e.g., physical keyboard, virtual keyboard, touchscreen, and the like).

Additionally, or alternatively, system 10 can be configured to set up the predefined mental condition (e.g., the predefined mental health score) automatically. In some embodiments, the UI module may be configured to display mental condition information 30 including the identified one or more timestamps corresponding to points in the discussion, where the first speaker is suspected to have been in a predefined mental condition, and predicted mental health score 80A in the one or more timestamps.

In addition, in some embodiments, mental condition monitoring module 90 may be configured to produce reference data element 90A, including a plurality of identified timestamps, corresponding to one or more discussions, and respective predictions of mental health score 80. In some embodiments, mental condition monitoring module 90 may be further configured to provide a notification of previous at least one case in which the speaker (e.g., patient) is suspected to have been in the predefined mental condition, based on the reference data element 90A. Furthermore, in some embodiments, the UI module may be configured to display mental condition information 30 including a notification of previous at least one case in which the first speaker is suspected to have been in the predefined mental condition.

Hence, having reference data element 90A including plurality of identified timestamps (at least two), corresponding to one or more discussions, and respective predictions of mental health score, provides means for monitoring mental condition changing over time and evaluation of psychotherapeutic sessions and/or treatment approaches effectiveness. For instance, in case reference data element 90A includes two identified timestamps, corresponding to two different discussions (e.g., two successive psychotherapeutic sessions), and two respective predictions of mental health score 80A, wherein the first one (e.g., the oldest) represents better mental condition than the second one, it can be concluded that patient's mental condition got worse, and therapist should adapt medication and increase the frequency of sessions. Therefore, in some embodiments, mental condition monitoring module 90 may be additionally configured to analyze reference data element 90A, in relation to a plurality of identified timestamps, and produce a recommendation data element (not shown in figures), representing a recommendation of treatment, based on said analysis. Furthermore, in some embodiments, the UI module may be configured to display mental condition information 30 including the recommendation data element.

It should also be understood that, in order to be able to provide even more reliable analysis and prediction, therapist's speech should also be considered. Namely, for example, it is better to understand whether two particular reactions of the patient (two predicted mental health scores 80A in two corresponding timestamps of two different discussions) were caused by the same topic brought up by the therapist or by different ones.

Hence, in some embodiments, transcription and diarization module 40 may be additionally configured to extract a second set of audio segments pertaining to speech of a second speaker (e.g., audio segments of therapist's speech (not shown in figures)) in the discussion. In some embodiments, n-gram clustering ML model 60 may be additionally configured to analyze the second set of audio segments (audio segments of therapist's speech) to produce one or more second textual n-grams (not shown in figures). In some embodiments, mental condition monitoring module 90 may be additionally configured to associate the one or more second textual n-grams to at least one identified timestamp in reference data element 90A.

In some embodiments, the mental health score may represent a binary score (or binary classification), indicating pertinence of the speaker (e.g., patient) to one of predefined classes (e.g., "depressed" or "normal"; "anxious" or "normal"; "depressed" or "anxious" etc.). It shall be understood that the present invention is not limited in regard of the form or format in which the mental health score may be represented.

In some embodiments, the mental health score may be provided as a value according to a scale representing a severity of depression/anxiety disorder. E.g., in order to facilitate therapist's understanding of what mental condition the particular predicted mental health score represents, in some embodiments, the mental health score represents an expected response of the speaker (e.g., patient) in a mental health questionnaire.

There are several questionnaires for depression/anxiety disorder diagnosis that are widely used by psychiatrists nowadays.

Patient Health Questionnaire-9 (PHQ-9) is known as a multipurpose instrument for screening, diagnosing, monitoring and measuring the severity of depression. Upon completing it, the result is represented in total points of mental health score from 0 to 27, wherein total scores of 5, 10, 15, and 20 represent cut points for mild, moderate, moderately severe and severe depression, respectively.

In turn, Generalized Anxiety Disorder 7-item (GAD-7) is known as an easy-to-perform initial screening instrument for generalized anxiety disorder. Upon completing this questionnaire, the result is represented in total points of mental health score from 0 to 21, wherein total scores of 5, 10, and 15, represent cut points for mild, moderate and severe anxiety disorder, respectively.

For every degree of depression/anxiety severity, the following treatment actions are advised to perform: none-minimal—no actions; mild—watchful waiting, repeating questionnaire at follow-up; moderate—treatment planning, considering counseling, follow-up and/or pharmacotherapy; moderately severe—active treatment with pharmacotherapy and/or psychotherapy; severe—immediate initiation of pharmacotherapy and, if severe impairment or poor response to therapy, expedited referral to a mental health specialist for psychotherapy and/or collaborative management.

Therefore, in some embodiments of the claimed invention, the mental health score represents an expected response of the first speaker (e.g., the patient) in a mental health questionnaire PHQ-9 or GAD-7.

In addition, in some exemplary embodiments, mental condition monitoring module 90 can produce the following recommendation data elements representing a recommendation of treatment based on mental health score 80A according to PHQ-9 or GAD-7. In case in the result of analysis of reference data element 90A mental condition monitoring module 90 reveals mental health score 80A increase of more than 3 points compared to the previous session, the recommendation data element may include the recommendations for the therapist to: adapt patient's medications; increase frequency/length of treatment sessions; explore suicidal ideations; create a safety plan; assign self-help tools; increase support between sessions; verify the patient is engaging in their assigned homework between sessions; focus on empirically-supported interventions; involve the patient's support system. In case in result of analysis of the reference data element 90A mental condition monitoring module 90 reveals no significant change in mental health score 80A, the recommendation data element may include the recommendations for the therapist to: take into account this information to monitor progress in future; if there is no significant change for 3 weeks, to reevaluate the medications; assess the patient's level of care, e.g., decide whether it is necessary to move to a more intensive partial hospitalization program; collaboratively explore with the patient if they could be doing anything else to support their recovery. In case in result of analysis of reference data element 90A mental condition monitoring module 90 reveals mental health score 80A decrease of more than 3 point compared to the previous session, the recommendation data element may include the recommendations for the therapist to: congratulate the patient on their progress; reassess medication and level of care; reinforce the skills the patent has learned and that have been found effective in decreasing symptoms.

Figure 4:
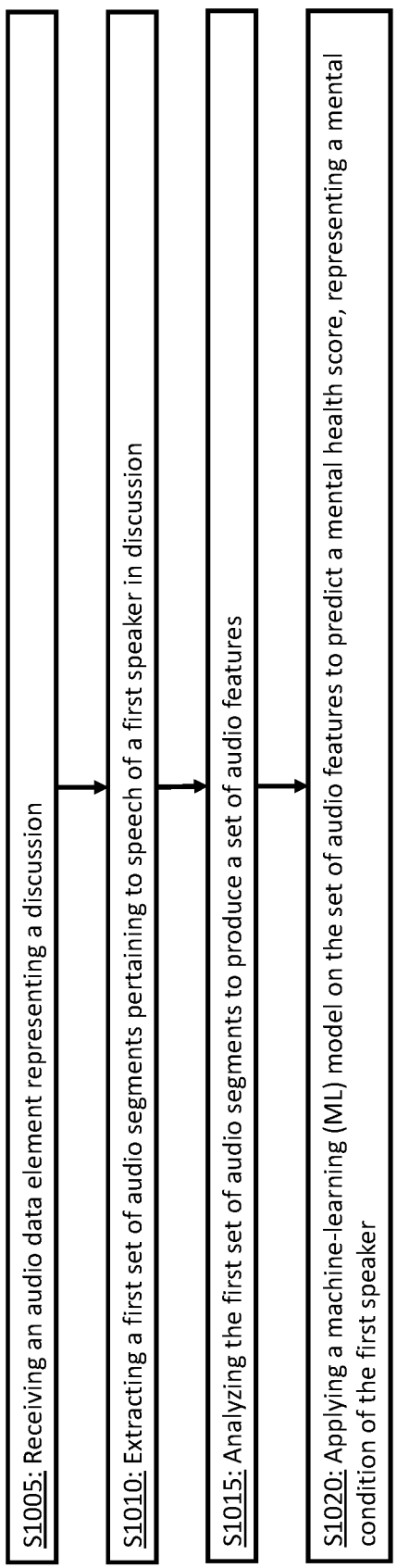
FIG. 4 is a flow diagram, depicting a method of analyzing speech, according to some embodiments.

Referring now to FIG. 4, a flow diagram is presented, depicting a method of analyzing speech, according to some embodiments.

As shown in step S1005, receiving audio data element 110A representing a discussion may be carried out by input device 7 and ADC driver module 110 stored on memory device 4 (as it is described with reference to FIGS. 1 and 2B).

As shown in step S1010, extracting a first set of audio segments pertaining to speech of a first speaker in discussion (audio segments 41A of patient's speech) can be carried out by transcription and diarization module 40 (as it is described with reference to FIG. 2B).

As shown in step S1015, analyzing the first set of audio segments (audio segments 41A of patient's speech) to produce set 50A of audio features can be carried out by audio feature extraction module 50 (as it is described with reference to FIGS. 2A and 2C).

As shown in step S1020, applying a ML model (mental condition prediction ML model 80) on set 50A of audio features to predict mental health score 80A, representing a mental condition of the first speaker, can be carried out correspondingly to the abovementioned description with reference to FIG. 2A.

As indicated above, the effectiveness of the claimed invention was proved empirically.

Firstly, a correlation between audio-burst-based features and emotional characteristics of human speech was tested. It was compared to a solution known in the art, which has 61% accuracy of classifying human speech by 7 emotions based on 126 regular frequency-based audio features. Prediction using audio-burst-based features has shown higher accuracy for the same task ~70%. Then, the task was simplified by dividing 7 emotions into 3 groups ("positive", "negative" and "neutral"), and it has led to an increase of accuracy up to 81%. Furthermore, a plurality of yet more simplified tests was held, including binary classification between two emotions (e.g., "sad" vs. "fear", "fear" vs. "angry", "angry" vs. "neutral" etc.) that has shown 100% accuracy in most cases. Therefore, the correlation between audio-burst-based features and emotional characteristics of human speech was proved.

Regular frequency-based features, that were used for tests, include, e.g., the features provided in Table 1 below.

TABLE 1

| List of regular frequency-based features | |
|---|---|
| zcr_Mean | energy_Mean |
| energy_entropy_Mean | spectral_centroid_Mean |
| spectral_spread_Mean | spectral_entropy_Mean |
| spectral_flux_Mean | spectral_rolloff_Mean |
| mfcc_1_Mean | mfcc_2_Mean |
| mfcc_3_Mean | mfcc_4_Mean |
| mfcc_5_Mean | mfcc_6_Mean |
| mfcc_7_Mean | mfcc_8_Mean |
| mfcc_9_Mean | mfcc_10_Mean |
| mfcc_11_Mean | mfcc_12_Mean |
| mfcc_13_Mean | delta zcr_Mean |
| delta energy_Mean | delta energy_entropy_Mean |
| delta spectral_centroid_Mean | delta spectral_spread_Mean |
| delta spectral_entropy_Mean | delta spectral_flux_Mean |
| delta spectral_rolloff_Mean | delta mfcc_1_Mean |
| delta mfcc_2_Mean | delta mfcc_3_Mean |
| delta mfcc_4_Mean | delta mfcc_5_Mean |
| delta mfcc_6_Mean | delta mfcc_7_Mean |
| delta mfcc_8_Mean | delta mfcc_9_Mean |
| delta mfcc_10_Mean | delta mfcc_11_Mean |
| delta mfcc_12_Mean | delta mfcc_13_Mean |
| zcr_std, | energy_entropy_std |
| energy_std | spectral_spread_std |
| spectral_centroid_std | spectral_flux_std |
| spectral_entropy_std | mfcc_1_std |
| spectral_rolloff_std | mfcc_3_std |
| mfcc_2_std | mfcc_5_std |
| mfcc_4_std | mfcc_7_std |
| mfcc_6_std | mfcc_9_std |
| mfcc_8_std | mfcc_11_std |
| mfcc_10_std | mfcc_13_std |
| mfcc_12_std | delta energy_std |
| delta zcr_std | delta spectral_centroid_std |
| delta energy_entropy_std | delta spectral_entropy_std |
| delta spectral_spread_std | delta spectral_rolloff_std |
| delta spectral_flux_std | delta mfcc_2_std |
| delta mfcc_1_std | delta mfcc_4_std |
| delta mfcc_3_std | delta mfcc_6_std |
| delta mfcc_5_std | delta mfcc_8_std |
| delta mfcc_7_std | delta mfcc_10_std |
| delta mfcc_9_std | delta mfcc_12_std |
| delta mfcc_11_std | max_f0 |
| delta mfcc_13_std | min_f0 |
| max_f0_index | Mean_f0 |
| min_f0_index | STD_f0 |
| Median_f0 | |

Clarification of Feature Names is Provided Below.

The Zero-Crossing Rate (ZCR) of an audio frame is the rate of sign-changes of the signal during the frame. In other words, it is the number of times the signal changes value, from positive to negative and vice versa, divided by the length of the frame.

Energy—a sum of squares of the signal values, normalized by the respective frame length.

Entropy of Energy—an entropy of sub-frames' normalized energies. It can be interpreted as a measure of rapid changes.

Spectral Centroid—a center of gravity of the spectrum.

Spectral Spread—a second central moment of the spectrum.

Spectral Entropy—an entropy of the normalized spectral energies for a set of sub-frames.

Spectral Flux—a squared difference between the normalized magnitudes of the spectra of the two successive frames.

Spectral Rolloff—a frequency below which 90% of the magnitude distribution of the spectrum is concentrated.

MFCCs— Mel Frequency Cepstral Coefficients form a cepstral representation where the frequency bands are not linear but distributed according to the mel-scale.

Audio-burst-based features, that were used for tests, include, e.g., the features provided in Table 2 below.

frequency-based features for evaluating speaker's mental condition. For conducting tests, three distinct datasets were taken: the combined gender dataset, female-only dataset, and male-only dataset. Each dataset consisted of a plurality of audio samples of patient's speech recorded during psychotherapeutic sessions (approximately 5 min long each), labeled with a binary mental health score. The binary mental health score (or binary classification) indicated pertinence of a speaker (a patient) to one of two predefined classes: "depressed" or "normal", and "anxious" or "normal". The combined gender dataset consisted of samples of voice recordings disregarding the gender of a speaker, female-only dataset consisted of samples of female speakers' voice recordings, and male-only dataset consisted of samples of male speakers' voice recordings, respectively. The results of said tests are illustrated in FIG. 5.

Figure 5:
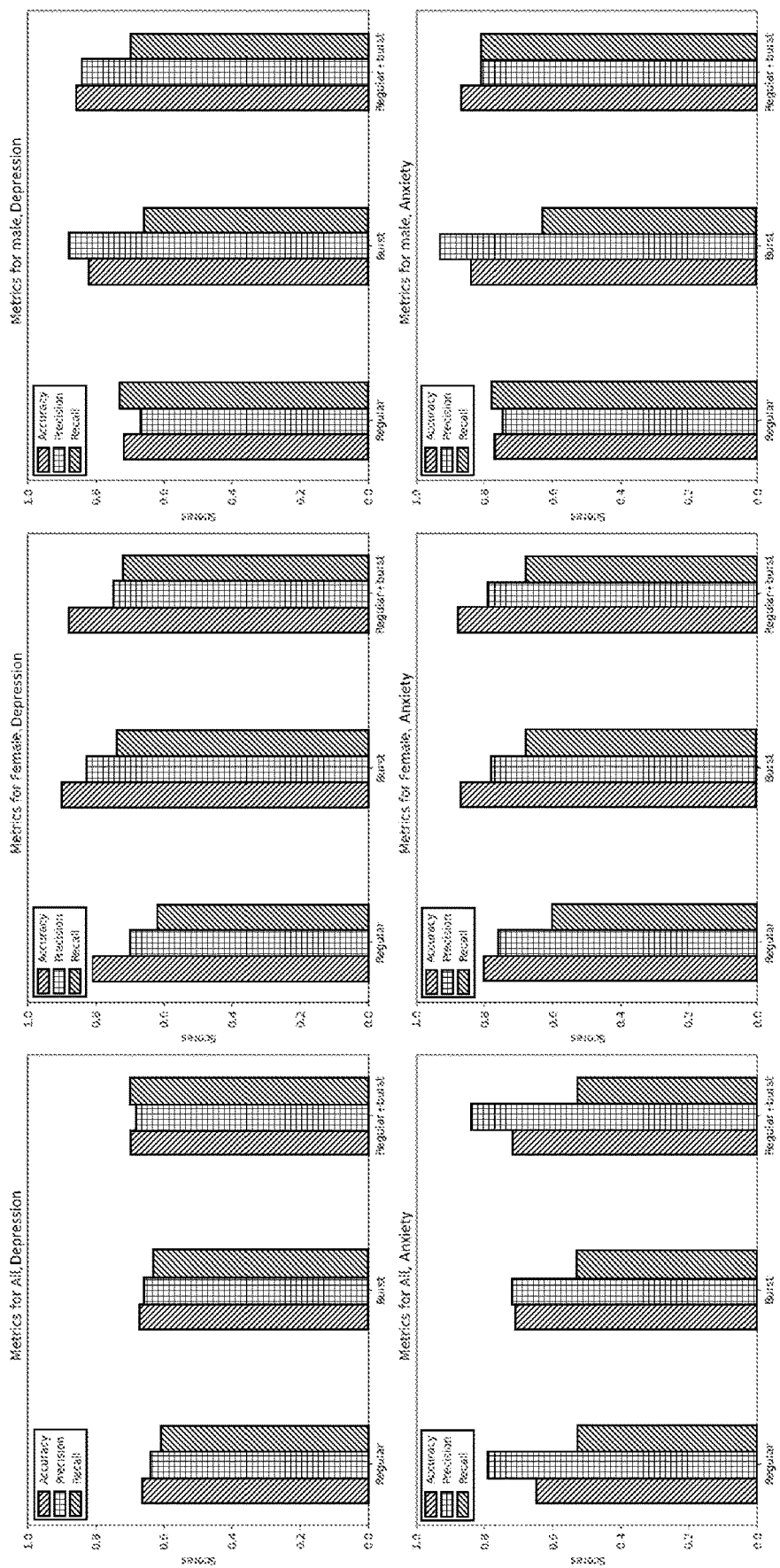
FIG. 5 is a set of charts depicting performance comparison of ML-based models using regular frequency-based features, audio-burst-based features, and combined regular frequency-based and audio-burst-based features.

In FIG. 5, a set of bar charts is depicted, representing performance comparison of ML-based models using regular frequency-based features, audio-burst-based features, and combined regular and audio-burst-based features. Each bar represents a value of a respective performance metric (accuracy, precision and recall) for each of said datasets and for each set of features used. As can be seen, in each case, either or both of audio-burst-based features and combined regular and audio-burst-based features has shown better perfor-

TABLE 2

List of audio-burst-based features

| | |
|---|---|
| F0_Mean_F0 | Duration_Mean_F0 |
| Amplitude_absolute_Mean_F0 | Amplitude_relative_to_threshold_Mean_F0 |
| AUC_Mean_F0 | CV_Mean_F0 |
| F0_Median_F0 | Duration_Median_F0 |
| Amplitude_absolute_Median_F0 | Amplitude_relative_to_threshold_Median_F0 |
| AUC_Median_F0 | CV_Median_F0 |
| F0_STD_F0 | Duration_STD_F0 |
| Amplitude_absolute_STD_F0 | Amplitude_relative_to_threshold_STD_F0 |
| AUC_STD_F0 | CV_STD_F0 |
| Start_burst_CV_F0 | End_burst_CV_F0 |
| F0_Mean_HighFrequency | Duration_Mean_HighFrequency |
| Amplitude_absolute_Mean_HighFrequency | Amplitude_relative_to_threshold_Mean_HighFrequency |
| AUC_Mean_HighFrequency | CV_Mean_HighFrequency |
| HighFrequency_Mean_HighFrequency | F0_Median_HighFrequency |
| Duration_Median_HighFrequency | Amplitude_absolute_Median_HighFrequency |
| AUC_Median_HighFrequency | Amplitude_relative_to_threshold_Median_HighFrequency |
| CV_Median_HighFrequency | HighFrequency_Median_HighFrequency |
| F0_STD_HighFrequency | Duration_STD_HighFrequency |
| Amplitude_absolute_STD_HighFrequency | Amplitude_relative_to_threshold_STD_HighFrequency |
| AUC_STD_HighFrequency | End_burst_CV_HighFrequency |
| _STD_HighFrequency | Start_burst_CV_HighFrequency |

The names of the features in Table 2 consist of: (a) feature type; (b) calculation type; and (c) frequency band. Feature type may include the following: duration, AUC, amplitude absolute, amplitude relative to a threshold, start of a burst, end of a burst. Calculation type may include the following: mean, median, STD, and CV (Coefficient of Variation). Frequency band may include: F0 and High Frequency.

After evaluating the correlation between audio-burst-based features and emotional characteristics of human speech, a plurality of tests was held in order to prove the advantage of using audio-burst-based features over standard mance than regular frequency-based features. Therefore, the improvement of the technical field of mental health analysis that can be achieved by using ML-based methods applied to audio-burst-based features of patient's speech was proved.

Furthermore, an association between each of audio-burst-based features and outcome measures (mental health score in the form of real integer value of GAD-7/PHQ-9 scores) was additionally evaluated using Spearman's correlation method adjusted by Benjamin Hofmann. The results of this evaluation are partially provided in Tables 3-8 below (not including a complete list of evaluated features).

TABLE 3

Association between audio-burst-based features and binary
anxiety prediction outcome. Female-only dataset.

| Feature name | Correlation | p-value | Adjusted p-value |
|---|---|---|---|
| Duration_Mean_HighFrequency | 0.29978438 | 1.31E−06 | 2.56E−05 |
| Duration_STD_HighFrequency | 0.21537584 | 0.00059131 | 0.00576525 |
| AUC_Mean_F0 | 0.16655602 | 0.00819166 | 0.03194748 |
| AUC_STD_F0 | 0.15665367 | 0.01296122 | 0.04212397 |
| Amplitude_absolute_Mean_F0 | 0.15215783 | 0.01583635 | 0.04750906 |
| Amplitude_absolute_Median_F0 | 0.14840653 | 0.01864732 | 0.04982243 |
| Amplitude_absolute_STD_F0 | 0.14263918 | 0.0238139 | 0.04982243 |
| Amplitude_relative_to_threshold_STD_F0 | 0.14263918 | 0.0238139 | 0.04982243 |
| Amplitude_relative_to_threshold_Mean_F0 | 0.14094395 | 0.02554997 | 0.04982243 |
| Amplitude_relative_to_threshold_Mean_HighFrequency | −0.1420672 | 0.02438789 | 0.04982243 |
| Amplitude_absolute_STD_HighFrequency | −0.1433517 | 0.02311513 | 0.04982243 |
| Amplitude_relative_to_threshold_STD_HighFrequency | −0.1433517 | 0.02311513 | 0.04982243 |
| Amplitude_relative_to_threshold_Median_HighFrequency | −0.1580098 | 0.01218929 | 0.04212397 |
| End_burst_CV_F0 | −0.1837891 | 0.00347607 | 0.02259443 |
| Start_burst_CV_F0 | −0.1838684 | 0.00346178 | 0.02259443 |

TABLE 4

Association between audio-burst-based features and binary
depression prediction outcome. Female-only dataset.

| Feature name | Correlation | p-value | Adjusted p-value |
|---|---|---|---|
| Duration_Mean_HighFrequency | 0.26985075 | 7.16E−06 | 0.00013966 |
| Duration_STD_HighFrequency | 0.16174451 | 0.00786111 | 0.02921712 |
| Amplitude_absolute_Median_HighFrequency | −0.1607876 | 0.00824073 | 0.02921712 |
| Amplitude_absolute_Mean_HighFrequency | −0.160852 | 0.00821469 | 0.02921712 |
| End_burst_CV_F0 | −0.1705433 | 0.00503683 | 0.02455454 |
| Start_burst_CV_F0 | −0.1705563 | 0.00503344 | 0.02455454 |
| Amplitude_relative_to_threshold_Mean_HighFrequency | −0.1779178 | 0.00341286 | 0.0221836 |
| Amplitude_absolute_STD_HighFrequency | −0.1828254 | 0.00261243 | 0.02037692 |
| Amplitude_relative_to_threshold_STD_HighFrequency | −0.1828254 | 0.00261243 | 0.02037692 |
| Amplitude_relative_to_threshold_Median_HighFrequency | −0.1839812 | 0.00245068 | 0.02037692 |

TABLE 5

Association between audio-burst-based features and binary
anxiety prediction outcome. Male-only dataset.

| Feature name | Correlation | p-value | Adjusted p-value |
|---|---|---|---|
| Duration Mean_F0 | 0.33412388 | 2.02E−05 | 0.00029541 |
| Duration_STD_F0 | 0.33216545 | 2.27E−05 | 0.00029541 |
| Amplitude_relative_to_threshold_Median_F0 | −0.2728768 | 0.00056797 | 0.00443019 |

TABLE 6

Association between audio-burst-based features and binary
depression prediction outcome. Male-only dataset.

| Feature name | Correlation | p-value | Adjusted p-value |
|---|---|---|---|
| Duration_STD_F0 | 0.29928456 | 0.00014742 | 0.00191651 |
| Duration_Mean_F0 | 0.22488097 | 0.00476632 | 0.03717727 |
| Amplitude_relative_to_threshold_Median_F0 | −0.2668822 | 0.00075757 | 0.00738635 |

TABLE 7

Association between audio-burst-based features and binary anxiety prediction outcome. Combined gender dataset.

| Feature name | Correlation | p-value | Adjusted p-value |
|---|---|---|---|
| Duration_Median_F0 | 0.09549 | 1.00E−12 | 1.96E−11 |
| Duration_Mean_F0 | 0.0904192 | 1.48E−11 | 1.93E−10 |
| AUC_Median_F0 | 0.08333885 | 5.00E−10 | 4.87E−09 |
| Duration_STD_F0 | 0.07838912 | 4.96E−09 | 3.87E−08 |
| AUC_Mean_F0 | 0.06583529 | 9.12E−07 | 5.93E−06 |
| Amplitude_relative_to_threshold_Mean_HighFrequency | 0.05582853 | 3.15E−05 | 0.00012293 |
| Amplitude_relative_to_threshold_Median_HighFrequency | 0.05362841 | 6.39E−05 | 0.00021534 |
| Amplitude_absolute_STD_HighFrequency | 0.05325848 | 7.18E−05 | 0.00021534 |
| Amplitude_relative_to_threshold_STD_HighFrequency | 0.05325848 | 7.18E−05 | 0.00021534 |
| AUC_Mean_HighFrequency | 0.05290483 | 8.02E−05 | 0.00022332 |
| AUC_Median_HighFrequency | 0.0517813 | 0.00011337 | 0.00029476 |
| AUC_STD_F0 | 0.05003606 | 0.00019165 | 0.00046716 |
| Amplitude_absolute_Mean_HighFrequency | 0.04278662 | 0.00142841 | 0.00327694 |
| Amplitude_absolute_Median_HighFrequency | 0.04028158 | 0.00268218 | 0.0058114 |
| Duration_Median_HighFrequency | 0.03503232 | 0.00904014 | 0.01855607 |
| AUC_STD_HighFrequency | 0.03099714 | 0.02090555 | 0.03705984 |
| Start_burst_CV_HighFrequency | −0.0317628 | 0.01794426 | 0.03332506 |
| End_burst_CV_HighFrequency | −0.0317647 | 0.01793726 | 0.03332506 |

TABLE 8

Association between audio-burst-based features and binary depression prediction outcome. Combined gender dataset.

| Feature name | Correlation | p-value | Adjusted p-value |
|---|---|---|---|
| Duration_Mean_F0 | 0.09986395 | 5.22E−14 | 1.02E−12 |
| Duration_Median_F0 | 0.09863161 | 1.06E−13 | 1.38E−12 |
| Duration_STD_F0 | 0.09781929 | 1.69E−13 | 1.65E−12 |
| AUC_Median_F0 | 0.08547804 | 1.21E−10 | 9.46E−10 |
| AUC_Mean_F0 | 0.07535673 | 1.40E−08 | 9.11E−08 |
| AUC_STD_F0 | 0.06885104 | 2.19E−07 | 1.22E−06 |
| Duration_Median_HighFrequency | 0.05119716 | 0.00011747 | 0.000572665 |
| AUC_Median_HighFrequency | 0.03570619 | 0.007250359 | 0.020197428 |
| Amplitude_relative_to_threshold_Mean_HighFrequency | 0.03387962 | 0.010844157 | 0.028194809 |
| Amplitude_relative_to_threshold_Median_HighFrequency | 0.0332626 | 0.012375346 | 0.030164907 |
| AUC_Mean_HighFrequency | 0.03168397 | 0.017196149 | 0.03944999 |
| Amplitude_absolute_STD_HighFrequency | 0.03039076 | 0.022301236 | 0.04577622 |
| Amplitude_relative_to_threshold_STD_HighFrequency | 0.03039076 | 0.022301236 | 0.04577622 |
| Start_burst_CV_HighFrequency | −0.0388128 | 0.003512597 | 0.010537791 |
| End_burst_CV_HighFrequency | −0.0388153 | 0.003510497 | 0.010537791 |

As it can be seen from the provided description, the claimed invention represents method and system for analyzing speech in order to assess mental condition, which are the technical means supporting psychiatric assessment of mental disorders such as depression and anxiety in an automatic nondisruptive manner, e.g., without direct patient's collaboration, and thereby increasing validity of the assessment. The claimed invention effectiveness has been experimentally tested and approved during its practical application.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of analyzing speech by at least one processor, the method comprising:
   receiving an audio data element representing a discussion;
   extracting a first set of audio segments pertaining to speech of a first speaker in the discussion;
   analyzing the first set of audio segments by:
      applying a band-pass filter on an audio segment of the first set of audio segments, to obtain a filtered version of the audio segment;
      applying a Hilbert transform on the filtered version of the audio segment, to obtain a Hilbert envelope;
      determining a burst threshold value;
      defining at least one audio burst based on the Hilbert envelope and the burst threshold value; and analyzing the at least one audio burst, to calculate one or more audio features comprising an audio burst Area Under Curve (AUC) defined as an integral between a positive edge of the Hilbert envelope and the burst threshold value; and applying a machine-learning (ML) model on said one or more audio features, to predict a mental health score, representing a mental condition of the first speaker.

2. The method of claim 1, wherein the mental health score represents an expected response of the first speaker in a mental health questionnaire.

3. The method of claim 1, further comprising analyzing the first set of audio segments to produce one or more textual n-grams;

analyzing the one or more textual n-grams to produce at least one textual feature, representing a mental condition of the first speaker; and further applying the ML model on the at least one textual feature, to predict the mental health score.

4. The method of claim 1, wherein
said one or more audio features further comprise features selected from a list consisting of: audio burst amplitudes, audio burst duration, and audio burst coefficient of variation (CV).

5. The method of claim 1, further comprising:
monitoring the predicted mental health score over time; and identifying one or more timestamps corresponding to points in the discussion, where the first speaker is suspected to have been in a predefined mental condition, based on said monitoring.

6. The method of claim 5, further comprising:
producing a reference data element, comprising a plurality of identified timestamps, corresponding to one or more discussions, and respective predictions of mental health score; and providing a notification of previous at least one case in which the first speaker is suspected to have been in the predefined mental condition, based on the reference data element.

7. The method of claim 6, further comprising:
analyzing the reference data element, in relation to the plurality of identified timestamps; and
producing a recommendation data element, representing a recommendation of treatment, based on said analysis.

8. The method of claim 6, further comprising:
extracting a second set of audio segments pertaining to speech of a second speaker in the discussion;
analyzing the second set of audio segments to produce one or more second textual n-grams; and
associating the one or more second textual n-grams to at least one identified timestamp in the reference data element.

9. A system for analyzing speech, the system comprising:
a non-transitory memory device, wherein modules of instruction code are stored, and at least one processor associated with the memory device, and configured to execute the modules of instruction code, whereupon execution of said modules of instruction code, the at least one processor is configured to:
receive an audio data element representing a discussion;
extract a first set of audio segments pertaining to speech of a first speaker in the discussion;

analyze the first set of audio segments by:
applying a band-pass filter on an audio segment of the first set of audio segments, to obtain a filtered version of the audio segment;
applying a Hilbert transform on the filtered version of the audio segment, to obtain a Hilbert envelope;
determining a burst threshold value;
defining at least one audio burst based on the Hilbert envelope and the burst threshold value; and
analyzing the at least one audio burst, to calculate one or more audio features comprising an audio burst Area Under Curve (AUC) defined as an integral between a positive edge of the Hilbert envelope and the burst threshold value; and
apply a machine-learning (ML) model on said one or more audio features, to predict a mental health score, representing a mental condition of the first speaker.

10. The system of claim 9, wherein the mental health score represents an expected response of the first speaker in a mental health questionnaire.

11. The system of claim 9, wherein the at least one processor is further configured to:
analyze the first set of audio segments to produce one or more textual n-grams;
analyze the one or more textual n-grams to produce at least one textual feature, representing a mental condition of the first speaker; and
apply the ML model on the at least one textual feature, to predict the mental health score.

12. The system of claim 9, wherein
said one or more audio features further comprise features selected from a list consisting of: audio burst amplitudes, audio burst duration, and audio burst coefficient of variation (CV).

13. The system of claim 9, wherein the at least one processor is further configured to:
monitor the predicted mental health score over time; and
identify one or more timestamps corresponding to points in the discussion, where the first speaker is suspected to have been in a predefined mental condition, based on said monitoring.

14. The system of claim 13, wherein the at least one processor is further configured to:
produce a reference data element, comprising a plurality of identified timestamps, corresponding to one or more discussions, and respective predictions of mental health score; and
provide a notification of previous at least one case in which the first speaker is suspected to have been in the predefined mental condition, based on the reference data element.

15. The system of claim 14, wherein the at least one processor is further configured to:
perform an analysis of the reference data element, in relation to the plurality of identified timestamps; and
produce a recommendation data element, representing a recommendation of treatment, based on said analysis.

16. The system of claim 14, wherein the at least one processor is further configured to:
extract a second set of audio segments pertaining to speech of a second speaker in the discussion;
analyze the second set of audio segments to produce one or more second textual n-grams; and
associate the one or more second textual n-grams to at least one identified timestamp in the reference data element.

* * * * *